United States Patent
Quadrat et al.

(10) Patent No.: US 10,191,080 B2
(45) Date of Patent: Jan. 29, 2019

(54) DRONE INCLUDING ADVANCE MEANS FOR COMPENSATING THE BIAS OF THE INERTIAL UNIT AS A FUNCTION OF THE TEMPERATURE

(71) Applicant: PARROT DRONES, Paris (FR)

(72) Inventors: Quentin Quadrat, Les Lilas (FR); Cedric Chaperon, Paris (FR); Henri Seydoux, Paris (FR)

(73) Assignee: Parrot Drones, Paris (FR)

( * ) Notice: Subject to any disclaimer, the term of this patent is extended or adjusted under 35 U.S.C. 154(b) by 183 days.

(21) Appl. No.: 15/176,094

(22) Filed: Jun. 7, 2016

(65) Prior Publication Data
US 2016/0370404 A1   Dec. 22, 2016

(30) Foreign Application Priority Data

Jun. 16, 2015  (FR) ...................... 15 55455

(51) Int. Cl.
*G01P 21/00* (2006.01)
*G01C 19/00* (2013.01)
(Continued)

(52) U.S. Cl.
CPC ............ *G01P 21/00* (2013.01); *B64C 39/024* (2013.01); *G01C 19/00* (2013.01); *G01C 21/16* (2013.01); *G05D 23/1919* (2013.01)

(58) Field of Classification Search
CPC ........ G01P 21/00; G01P 15/125; G01P 15/18; G01C 25/005; G01C 25/00; B64C 39/024
(Continued)

(56) References Cited

U.S. PATENT DOCUMENTS

| 8,948,935 B1* | 2/2015 | Peeters | B64C 39/024 701/3 |
| 9,677,564 B1* | 6/2017 | Woodworth | B64C 39/024 |

(Continued)

FOREIGN PATENT DOCUMENTS

EP   2 644 240 A1   10/2013

OTHER PUBLICATIONS

Kim J D et al., "Efficient Control System for PCR Chips", vol. 7929, No. 1, 2011-02-140, pp. 1-9, XP060011017.
(Continued)

*Primary Examiner* — Eric S McCall
*Assistant Examiner* — Mohammed E Keramet-Amircola
(74) *Attorney, Agent, or Firm* — Haverstock & Owens LLP

(57) ABSTRACT

The inertial unit, IMU, of the drone is mounted on a main circuit board. The IMU (26) includes an internal temperature sensor delivering a chip temperature signal ($\theta°_{chip}$). A heating component (36) is mounted on the circuit board near the IMU, and it is provided a thermal guide, incorporated to the circuit board, extending between the heating component and the IMU so as to allow a transfer to the IMU of the heat produced by the heating component. This thermal guide may in particular be a metal planar layer incorporated to the board, in particular a ground plane. A thermal regulation circuit (44-62) receives as an input the chip temperature signal ($\theta_{chip}$) and a set-point temperature signal ($\theta°_{ref}$), and delivers a piloting signal (TH_PWM) of the heating component, so as to control the heat supply to the IMU. It is in particular possible to use this fast increase in temperature to perform a complete calibration of the IMU in a few minutes.

11 Claims, 3 Drawing Sheets

(51) Int. Cl.
   *G05D 23/19* (2006.01)
   *B64C 39/02* (2006.01)
   *G01C 21/16* (2006.01)

(58) Field of Classification Search
   USPC .................................. 73/1.38, 1.76, 1.78
   See application file for complete search history.

(56) References Cited

U.S. PATENT DOCUMENTS

| | | | | |
|---|---|---|---|---|
| 9,797,728 | B2* | 10/2017 | Eline | G01C 21/165 |
| 9,836,049 | B1* | 12/2017 | Tu | G05D 1/0022 |
| 2012/0197461 | A1* | 8/2012 | Barrows | G05D 1/0858 |
| | | | | 701/1 |
| 2013/0213111 | A1* | 8/2013 | Bourzier | G01C 21/16 |
| | | | | 73/1.78 |
| 2015/0279173 | A1* | 10/2015 | Hyde | G06Q 10/10 |
| | | | | 340/815.4 |
| 2015/0279174 | A1* | 10/2015 | Hyde | G06F 3/04842 |
| | | | | 340/815.4 |
| 2015/0298822 | A1* | 10/2015 | Eline | B64C 39/024 |
| | | | | 244/75.1 |
| 2015/0370250 | A1* | 12/2015 | Bachrach | G05D 1/0016 |
| | | | | 701/2 |
| 2016/0019458 | A1* | 1/2016 | Kaufhold | G01S 7/417 |
| | | | | 342/25 F |
| 2016/0130015 | A1* | 5/2016 | Caubel | B64C 27/001 |
| | | | | 244/120 |
| 2016/0136482 | A1* | 5/2016 | Askew, Jr. | G01S 19/19 |
| | | | | 700/91 |
| 2016/0154112 | A1* | 6/2016 | Nichols | G01S 19/215 |
| | | | | 342/357.47 |
| 2016/0179096 | A1* | 6/2016 | Bradlow | B64C 19/00 |
| | | | | 701/8 |
| 2016/0259337 | A1* | 9/2016 | Ruffier | G05D 1/0094 |
| 2016/0266579 | A1* | 9/2016 | Chen | G05D 1/0038 |
| 2016/0299233 | A1* | 10/2016 | Levien | G01C 21/00 |
| 2016/0307448 | A1* | 10/2016 | Salnikov | A01B 79/02 |
| 2016/0311545 | A1* | 10/2016 | Parks | B64C 5/02 |
| 2016/0327950 | A1* | 11/2016 | Bachrach | G05D 1/0016 |

OTHER PUBLICATIONS

Luca Petricca et al., "Design Fabrication and Test of an Embedded Lightweight Kinematic Autopilot (ELKA)", International Journal of Intelligent Unmanned Systems, vol. 2, No. 2, May 6, 2014, pp. 140-150, XP055267913.

* cited by examiner

DRONE INCLUDING ADVANCE MEANS FOR COMPENSATING THE BIAS OF THE INERTIAL UNIT AS A FUNCTION OF THE TEMPERATURE

The invention relates to the motorized flying devices such as drones, in particular the rotary-wing drones such as the quadricopters.

The AR.Drone 2.0 or the Bebop Drone of Parrot SA, Paris, France, are typical examples of such quadricopters. They are equipped with a series of sensors (accelerometers, 3-axis gyrometers, altimeters), a front camera capturing an image of the scene towards which the drone is directed, and a vertical-view camera capturing an image of the overflown ground. They are provided with multiple rotors driven by respective motors, which can be controlled in a differentiated manner so as to pilot the drone in attitude and speed. Various aspects of such drones are described, among other things, in the EP 2 364 757 A1, EP 2 400 460 A1, EP 2 613 213 A1 or EP 2 644 240 A1, EP 2 613 214 A1 (Parrot SA).

For leisure drones, the inertial unit or IMU (Inertial Measurement Unit) is made from low-cost MEMS components, whose main problem is their sensitivity to the temperature, because they do not correct by themselves their output values as a function of the temperature of the sensors.

Now, the IMU temperature may vary significantly, typically between +30° C. and +60° C during a same use. Indeed, at the beginning of use, the IMU temperature is close to the ambient temperature, but during the use, the warming of the components, and in particular of the processor, causes a temperature rising inside the drone body. Conversely, the starting of the motors and a fast flight generate a flow of cold air tending to lower this temperature, which will then be able to increase to far higher values when the drone will land to the ground, etc.

Those disturbing effects are all the more marked that the heat-generating components (processor, radio chip, motor switching MOSFETs, etc.) are mounted on the same circuit board as the IMU, which tends to accelerate the calorie diffusion.

De facto, the error of the gyrometer signals (and, likewise, the accelerometer signals) delivered by the IMU presents a drift (bias) that is both significant (several angle degrees per second) and variable with the temperature. Moreover, the temperature variations of the sensors are liable to cause an hysteresis effect on the drift of these latter, which makes the continuous correction of the bias inaccurate.

To compensate for this bias, the IMU is subjected to a factory calibration procedure, consisting in varying the ambient temperature in a controlled manner, in rising the inner temperature of the IMU (chip temperature, given by a senor located inside the IMU) and in measuring the corresponding bias. A bias/temperature characteristic, generally a non-linear characteristic able to be modelled by a polynomial, can hence be determined. The parameters describing this characteristic (the polynomial coefficients) are kept in memory and will be used later to correct in real time the bias of the measurement delivered by the sensors, as a function of the temperature read at a given time.

This procedure can be applied to a drone provided with an IMU inner-chip temperature sensor, as that described for example in the article of L Petriccia et al., "Design, fabrication and test of an embedded lightweight kinematic autopilot (ELKA)", *International Journal of Intelligent Unmanned Systems,* Vol. 2, May 2014, pp.140-150.

The article of X. Niu et al. "Fast Thermal Calibration of Low-Grade Inertial Sensors and Inertial Measurements Units", *Sensors,* 2013, 13, pp. 12192-12217, describes a calibration technique such as that exposed hereinabove, and proposes in particular, instead of letting the ambient temperature stabilize, to progressively vary this temperature following a continuous ramp. This temperature ramp technique makes it possible, while keeping a sufficient calibration accuracy, to reduce to about 3 hours the calibration process.

But this duration is still excessive for mass production of drones, and the need remains for a faster method of calibration, typically reduced to only a few minutes, which is compatible with high production rates in factory.

It would also be desirable to be able to later reiterate the calibration, upon a command by the user, without the latter has to implement a particular instrumentation, and without the duration of this recalibration is crippling. Finally, in any case, it seems desirable, in order to improve the quality of the measurements of attitude of the drone in use, to minimise the fluctuations of temperature during the flight between cold and hot environments, so as to efficiently take into account the measured temperature of the IMU chip to correct in real time the bias as a function of the bias/temperature characteristic obtained and memorized during the preliminary calibration performed in factory.

In a far different domain, which is that of the molecular biologic analyses involving an in vitro genic amplification of the DNA by a PCR (Polymerase Chain Reaction) technique, biochips of the "Lab-on-a-chip" type, as that described for example in an article of Kim et al. "Efficient Control Systems for PCR Chips", *Microfluidics, BioMEMS and Medical Microsystems IX,* published in the *Proceedings of SPIE,* Vol. 7929, no. 1, February 2011, pp. 1-9, can be used. The PCR biochip described is provided with a temperature regulation system making it possible to accurately adjust the different temperatures corresponding to the successive steps of the PCR reaction (denaturation, renaturation and extension) during each cycle of the protocol of analysis.

However, those aspects are not those of the domain of the invention, which relates to the improvement of the behaviour of an inertial unit (IMU) of a drone, in particular the correction of the gyrometer bias by a suitable, efficient and fast procedure of preliminary calibration.

To solve the above-mentioned problems, peculiar to a drone inertial unit, the invention proposes a drone comprising, in a manner known in itself, in particular from the above-mentioned article of Petriccia et al., a main circuit board on which are mounted electronic components as well as an inertial unit, IMU, comprising gyrometer sensors for measuring the instantaneous rotations of the drone in an absolute reference system, and/or accelerometer sensors for measuring the accelerations of the drone in this reference system, the IMU including an internal temperature sensor delivering a chip temperature signal.

Characteristically of the invention, it is further provided:
a heating component mounted on the circuit board near the IMU;
a thermal guide incorporated to the circuit board, this thermal guide extending between the heating component and the IMU so as to allow a transfer to the IMU of the heat produced by the heating component; and
a thermal regulation circuit, receiving as an input the chip temperature signal and a predetermined set-point temperature signal, and outputting a heating component piloting signal, so as to control the heat supplied to the IMU as a function of the difference between chip temperature and set-point temperature.

According to various advantageous subsidiary characteristics:

it is further provided a memory, storing values of a polynomial approximating a bias/chip temperature characteristic of the IMU, and a thermal error correction circuit adapted to apply to the raw signals delivered by the gyrometer and/or accelerometer sensors of the IMU bias corrections as a function of the chip temperature, these corrections being based on the polynomial values stored in the memory;

the thermal guide is a metal planar layer incorporated to the circuit board and extending under the IMU and under the heating component, in particular a plane of electric ground of the IMU and of the heating component, connected to the common ground of the circuit board;

the heating component is a bipolar transistor associated to a stage of controlled polarisation of the base of this transistor, as a function of the piloting signal delivered by the thermal regulation circuit; and the piloting signal delivered by the thermal regulation circuit is a PWM signal whose duty cycle is modulated as a function the difference between the chip temperature and the set-point temperature.

The invention has also for object a method of calibration of the IMU of such a drone, comprising, characteristically, the steps of:

a) piloting the heating component so as to generate a chip temperature ramp varying progressively from an initial temperature to a final temperature;

b) during this temperature ramp, reading the bias values of the IMU for a plurality of chip temperature values, and establishing a bias/temperature characteristic;

c) searching for a polynomial approximating at the closest the characteristic obtained at step b); and d) memorizing values of the polynomial found at step c), as values of IMU bias correction as a function of the chip temperature.

According to various advantageous subsidiary characteristics of this method:

the initial temperature is an ambient temperature and the final temperature is a nominal operation temperature of the IMU;

the duration of the temperature ramp of step b), from the initial temperature to the final temperature, is lower than 3 minutes;

step b) is executed in a static configuration of the IMU, and it is further provided, after step d), a dynamic calibration of the IMU, comprising the steps of:

e) installing the circuit board on a rotating support and applying predetermined rotations to the IMU; and f) during these predetermined rotations, reading the raw signals delivered by the gyrometric sensors of the IMU, and applying to these raw signals a thermal correction as a function of the chip temperature, these corrections being based on the polynomial values memorized at step d);

the heating component is deactivated during steps e) and f).

An example of implementation of the present invention will now be described, with reference to the appended drawings in which the same reference denote identical or functionally similar elements throughout the figures.

An exemplary embodiment and implementation of the invention will now be described.

Figure 1:
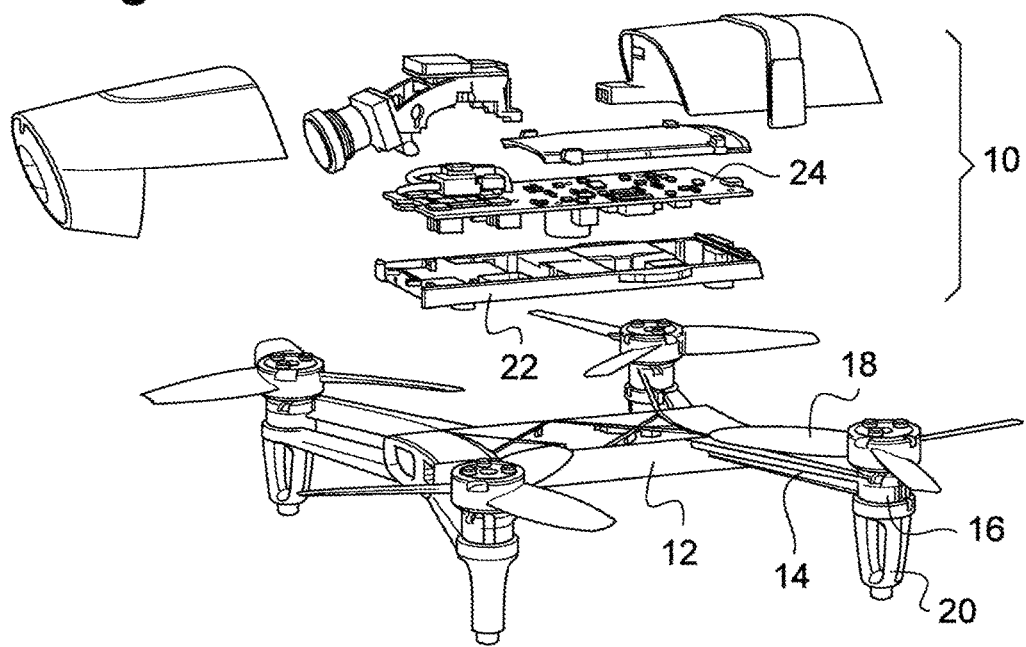
FIG. 1 is an exploded perspective view of a drone showing, dissociated from each other, the different inner elements of the latter.

In FIG. 1, a drone of the quadricopter type is shown, with a drone body 10 comprising, in lower part, a frame 12 integral with four link arms 14 radiating from the frame. Each arm is equipped at its distal end with a propulsion unit 16 comprising a motor driving a propeller 18 into rotation. In lower part, the propulsion unit 16 is continued by a footing stirrup 20 by which the drone can rest on the ground when stopped.

The drone body comprises a plate 22 intended to receive the main circuit board 24 carrying the almost-totality of the electronic components of the drone, including the inertial unit of the latter. The plate 22 is in the form of a single-part element made of a light-weight metal material and serves as a cooler for evacuating the calories in excess of some components generating high quantity of heat, such as the main processor, the radio chip, the motor switching MOSFET, etc. The cooling effect is increased by the air flows resulting from the aerodynamic effects, and possibly by starting a fan, in particular with the drone does not fly.

Figure 2:
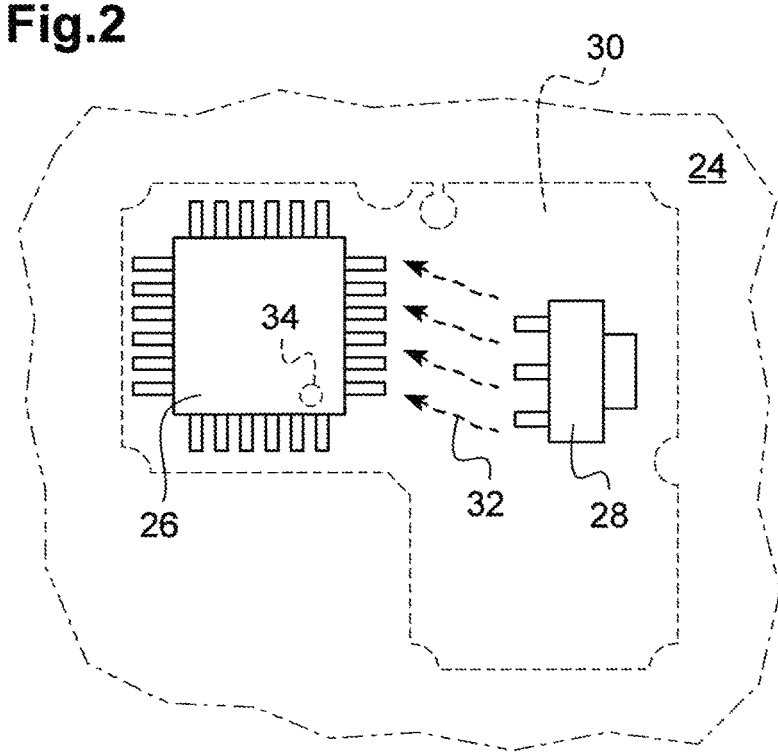
FIG. 2 is a partial, enlarged view of the region of the circuit board carrying the IMU and the heating component.

FIG. 2 is an enlarged view of the main circuit board 24, at the place where the inertial unit 26 is implanted. This inertial unit (IMU) is a component incorporating a three-axis gyrometer and a three-axis accelerometer.

Characteristically, it is provided, near the IMU 26, a heating component 28 liable to produce thermal energy in a controlled manner. This energy is intended to be supplied to the IMU 26, through a conductive thermal element 30, which is for example a metal planar layer (cupper layer) incorporated to the main circuit board and extending both under the IMU 26 and under the heating component 28. This metal planar layer plays the role of a thermal guide between the heating component 28 and the IMU 26 so as to allow a transfer (symbolized by the arrows 32) to the IMU of the heat produced by the heating component.

It will be noted that the IMU incorporates a sensor 34 delivering a signal of measurement of its inner temperature (IMU chip temperature). As it will be exposed in detail hereinafter, this signal $\theta°_{chip}$ will be used to ensure a thermal regulation by controlled activation of the heating component 28.

Figure 3:
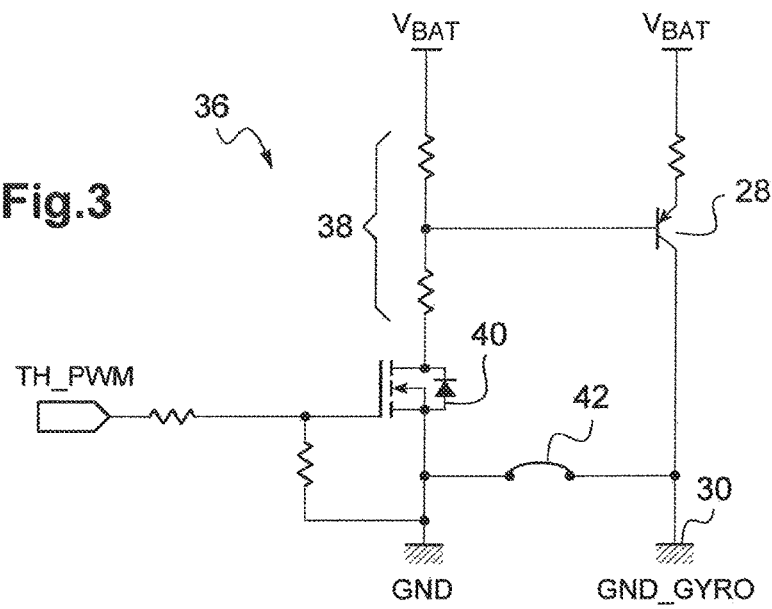
FIG. 3 is a detail of the heating component and of its piloting circuit.

FIG. 3 illustrates the heating component 28 and its piloting stage 36. The component 28 may be a simple resistance but, as illustrated, it is preferably constituted by a bipolar transistor associated with a stage 38 of polarization of the base of this transistor. The polarisation is adjusted so as to make the transistor 28 operate in resistive mode, the generation of heat occurring essentially at the collector. The transistor is for example a power PNP 2STN2550 of STMicroelectronics.

The dividing bridge 38 of polarization of the base of the transistor 28 is controlled on a "all or nothing" basis by a switching transistor 40, for example a N-channel MOSFET whose grid receives a digital signal TH-PWM, that is a binary signal of the PWM (pulse width modulation) type, whose duty cycle is comprised between 0 and 100%. It is hence possible to control in a manner that is both very fine and very reactive the switching of the transistor 28 to a conductive state, and hence the quantity of heat emitted by the latter, between a minimum and a maximum, according to the duty cycle of the signal TH_PWM.

The metal planar layer 30 forming a thermal guide of the main circuit board 24 is advantageously a plane of electric ground GND_GYRO common to the IMU 26 and to the heating component 28, this ground GND_GYRO being connected to the common ground GND of the main circuit board by a strap 42.

Figure 4:
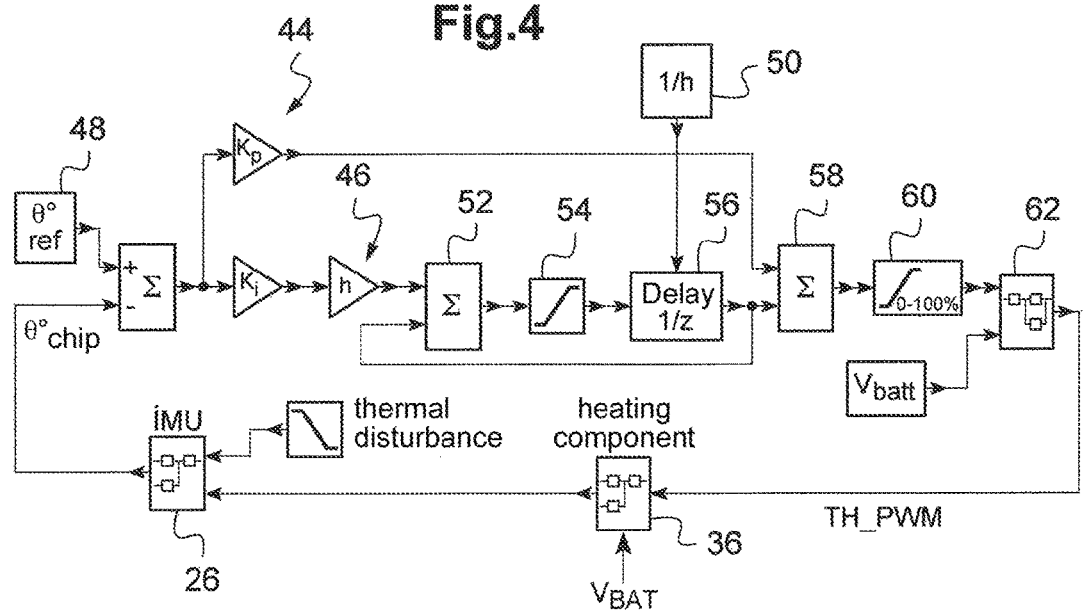
FIG. 4 shows the chain of elements of the temperature thermal regulation circuit.

FIG. 4 illustrates the thermal regulation circuit making it possible to control the temperature of the IMU. It will be noted that, although these schemes are presented as block diagrams according to a normalized formalism, the implementation of the different functions is essentially software-based, this representation being only illustrative.

The regulation circuit is based on a PI (proportional-integral) control, with a proportional loop 44 and a discrete integrating loop 46, 50-56. In concrete terms, a PI regulator is sufficient because the temperature transfer model may be approximated as a linear system of the first order, hence easily controllable by a simple PID, even if this model is unknown.

The regulation operates based on an error signal e corresponding to a difference between the temperature observed, i.e. the chip temperature $\theta°_{chip}$ (temperature of the IMU 26, measured by the sensor 34) and a reference temperature $\theta°_{ref}$ memorized in 48. For example $\theta°_{ref}$=50° C., a value that is higher than the asymptotic temperature and lower than the maximum temperature of the IMU indicated by the manufacturer specifications.

The system operates in discrete time, corresponding to a digital sample. The integral can hence be liken to a sum of the signal over a determined time period by the block 50, this sum being calculated by the blocks 52 to 56.

The blocks 58 and 60 combine the outputs of the proportional and integrating loops 44 and 46 and bring the resulting signal back to a range of variation 0-100% (to allow a duty-cycle control). The result is memorized in a PWM register 62 and applied as an input (signal TH_PWM) to the piloting circuit 36 of the heating component 28. It will be noted that, in the flight configurations, the cooling of the board is made naturally by the plate 22, the duty cycle of the PWM signal being than of 0%.

The controlled activation of the heating component 36 makes is possible to heat the IMU as needed to reach and maintain a reference temperature the closest possible to a constant value.

The temperature rising is hence accelerated and the IMU 26 rapidly reaches a nominal temperature that will be close to a relatively stable asymptote, where the bias variations will be minimized and will have a little hysteresis effect.

This rapid temperature rising will also be used to accelerate the calibration process.

Indeed, the calibration technique described in the article of Niu et al. gives a very good accuracy, but suffers from a major drawback, that is to say that, for a single unit, the calibration requires 3 hours, and such a duration is crippling for a mass production, with a high rate, even if several boards are calibrated simultaneously.

Hence, characteristically of the invention, the heating component is used to heat the IMU during its factory calibration (or during a latter recalibration).

For a factory calibration, the board is maintained in static position, without the plate 22 (whose presence would have for effect to slow down the temperature rising), and the gyrometers and the accelerometers biases are measured during the temperature increase. The IMU may be for example heated in 150 seconds from an initial temperature of +30° C. to a final temperature of +65° C., i.e. a time very lower than the 20 minutes contemplated by the above-mentioned article of Niu et al. During this temperature rising, the noticed bias is memorized for each temperature value (chip temperature delivered by the sensor 34), and the bias/temperature characteristic obtained is then modelled as a polynomial, for example a polynomial of the third order, by implementation of a conventional technique of recursive polynomial regression, the recursivity avoiding the necessity to memorize all the data.

It will be noted that a rather high reference temperature is chosen, herein +65° C., which is a value higher than the reference temperature chosen for the thermal regulation in flight (which was of +50° C.), while remaining lower than the maximum temperature indicated by the IMU manufacturer. This allows obtaining a more extended polynomial: indeed, when, for the correction of the values, a polynomial interpolation is made beyond the range of values, the error may become significant, according to the degree of the polynomial. To sum up, i) a calibration is operated in factory, making it possible to correct the bias of the sensors over a range +30° C./+60° C., and ii) during the flight, the temperature is regulated around +50° C., so that, even if the temperature exceeds +50° C. at a given instant, the biases of the sensors are always suitably corrected.

A static calibration of the thermal biases of the gyrometers is hence made in an ultra-rapid manner, and the same for the biases of the accelerometers.

The static calibration may advantageously be completed by a dynamic calibration making it possible to determine the scale factors and the nonorthogonalities of the sensors. The dynamic calibration consists in placing the board of a mobile unit to perform the predetermined rotations at constant speed according to the three axes. During this dynamic calibration, the heating component may be deactivated. During the predetermined rotations, the signals delivered by the sensors of the IMU are read and a thermal correction is applied thereto as a function of the chip temperature, this thermal correction is calculated from polynomial values previously memorized during the static calibration. The data corrected in temperature are for example used in a general algorithm of the gradient descent type making it possible to calibrate the inertial data with respect to a theoretical rotation.

The duration of this dynamic calibration is of the order of 45 seconds, a duration that is perfectly compatible with a factory production at a high rate.

In the case of a latter recalibration by the user, the method is the same as for the initial static calibration in factory. It will be noted that this calibration may be made easily, without dismounting the drone (whereas the factory calibration is made in isolation on the board), with the drone in its environment, that is can be reiterated as needed, and that it lasts only a very limited time, of the order of 2 to 3 minutes. The cooling produced by the metal plate 22, which is present during this later calibration, has however for consequence to reduce the maximum temperature and to lengthen the time of calibration.

Figure 5:
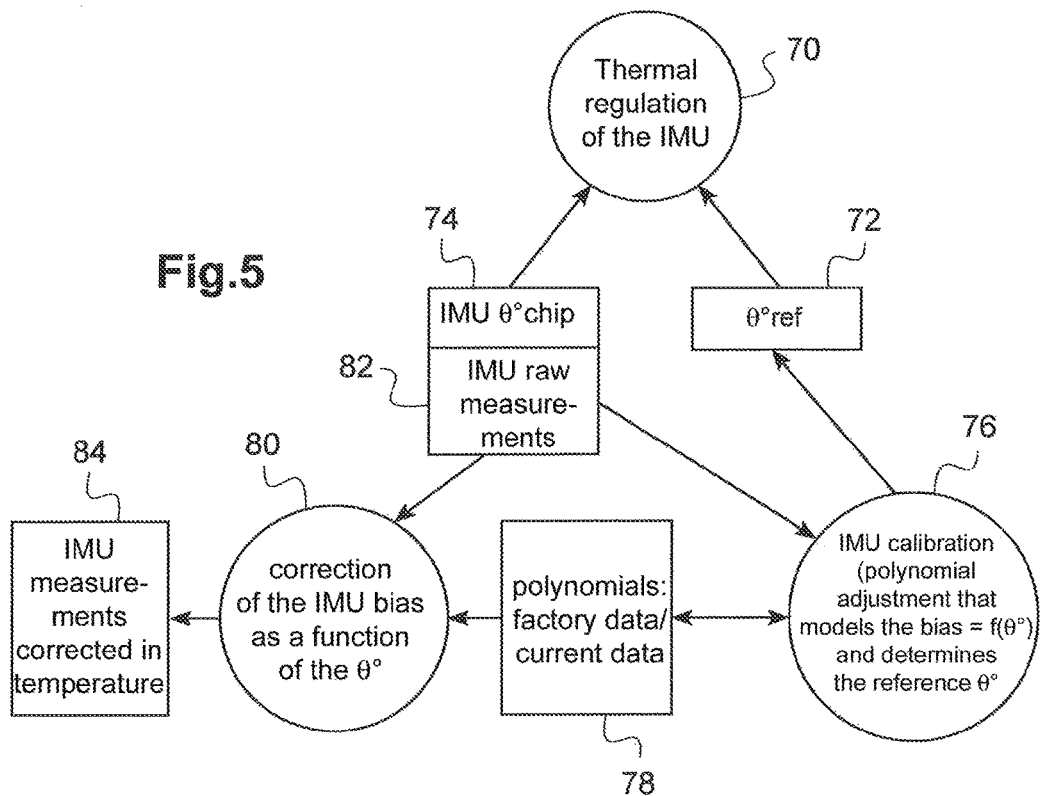
FIG. 5 is a process diagram explaining the different functions of calibration, thermal regulation and bias correction implemented by the invention.

FIG. 5 is a diagram explaining the different processes i) of calibration, ii) of thermal regulation and iii) of bias correction implemented according to the invention.

The process 70 of thermal regulation consists in heating the IMU by the heating component 28 through its piloting circuit 36 and the control chain illustrated in FIG. 4. The input variables are the reference temperature $\theta°_{ref}$ memorized in 72 and the chip temperature $\theta°_{chip}$ of the IMU delivered in 74.

The calibration process 76 of the IMU consists in calculating the thermal drifts of the IMU by finding the polynomial that approaches at best the bias/temperature characteristic. This process may be made in factory, or reiterated by the user if he desires to later recalibrate the IMU. The input/output data are the file 78 of the polynomial parameters, obtained by the factory calibration, as well as, if need be, those of the latter recalibration performed. These files also store parameters corresponding to the scale factor errors of the IMU, which may possibly be used as a complement (it will be referred, in this respect, for more details, to the article de Niu et al.).

The process 80 of correction of the IMU bias receives as an input the raw measurements of the IMU delivered in 82, the inner temperature $\theta°_{chip}$ of the IMU chip delivered in 74, and the polynomial data of the bias/temperature characteristic memorized in 78. The bias correction may be operated based on the current temperature of the chip, and produces in 84 IMU measurements corrected to the temperature.

The invention claimed is:

1. A drone, comprising a main circuit board (24) on which are mounted electronic components as well as an inertial unit, IMU, (26) comprising gyrometer sensors for measuring the instantaneous rotations of the drone in an absolute reference system, and/or accelerometer sensors for measuring accelerations of the drone in this reference system, the IMU (26) including an internal temperature sensor (34) delivering a chip temperature signal ($\theta°_{chip}$),
characterized in that it comprises:
 a heating component (28) mounted on the circuit board (24) near the IMU (26);
 a thermal guide (30) incorporated to the circuit board (24), this thermal guide extending between the heating component (28) and the IMU (26) so as to allow a transfer (32) to the IMU of the heat produced by the heating component; and
 a thermal regulation circuit (44-62), receiving as an input the chip temperature signal ($\theta°_{chip}$) and a predetermined set-point temperature signal ($\theta°_{ref}$), and outputting a heating component piloting signal (TH_PWM), so as to control the heat supply to the IMU as a function of the difference between chip temperature and set-point temperature.

2. The drone of claim 1, further comprising:
 a memory (78) storing values of a polynomial approximating a bias/chip temperature characteristic of the IMU; and
 a circuit of thermal error correction (80), adapted to apply to the raw signals (82) delivered by the gyrometer and/or accelerometer sensors of the IMU bias corrections as a function of the chip temperature, these corrections being based on the polynomial values stored in the memory.

3. The drone of claim 1, wherein the thermal guide is a metal planar layer (30) incorporated to the circuit board (24) and extending under the IMU (26) and under the heating component (28).

4. The drone of claim 3, wherein the metal planar layer is a plane of electric ground (GND_GYRO) of the IMU and of the heating component, connected to the common ground (GND) of the circuit board.

5. The drone of claim 1, wherein the heating component is a bipolar transistor associated to a stage (38) of controlled polarisation of the base of this transistor, as a function of the piloting signal (TH_PWM) delivered by the thermal regulation circuit.

6. The drone of claim 1, wherein the piloting signal (TH_PWM) delivered by the thermal regulation circuit is a PWM signal whose duty cycle is modulated as a function the difference between the chip temperature and the set-point temperature.

7. A method of calibration of the IMU (26) of a drone according to claim 1, comprising the following steps:
 a) piloting the heating component (28) so as to generate a chip temperature ramp varying progressively from an initial temperature to a final temperature;
 b) during this temperature ramp, reading the bias values of the IMU (26) for a plurality of chip temperature values, and establishing a bias/temperature characteristic;
 c) searching for a polynomial approximating at the closest the characteristic obtained at step b); and
 d) memorizing values of the polynomial found at step c), as values of IMU bias correction as a function of the chip temperature.

8. The method of claim 7, wherein the initial temperature is an ambient temperature and the final temperature is a nominal operation temperature of the IMU.

9. The method of claim 7, wherein the duration of the temperature ramp of step b, from the initial temperature to the final temperature, is lower than 3 minutes.

10. The method of claim 7, wherein step b) is executed in a static configuration of the IMU, and it is further provided, after step d), a dynamic calibration of the IMU, comprising the steps of:
 e) installing the circuit board on a rotating support and applying predetermined rotations to the IMU; and
 f) during these predetermined rotations, reading the raw signals delivered by the gyrometric sensors of the IMU, and applying these raw signals of a thermal correction as a function of the chip temperature, these corrections being based on the polynomial values memorized at step d).

11. The method of claim 10, wherein the heating component is deactivated during the steps e) and f).

* * * * *